(12) United States Patent
Zhu

(10) Patent No.: US 12,345,979 B2
(45) Date of Patent: Jul. 1, 2025

(54) DISPLAY PANEL

(71) Applicant: SUZHOU CHINA STAR OPTOELECTRONICS TECHNOLOGY CO., LTD., Jiangsu (CN)

(72) Inventor: Mengqing Zhu, Jiangsu (CN)

(73) Assignee: SUZHOU CHINA STAR OPTOELECTRONICS TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/190,180

(22) Filed: Mar. 27, 2023

(65) Prior Publication Data

US 2024/0264482 A1  Aug. 8, 2024

(30) Foreign Application Priority Data

Feb. 8, 2023 (CN) .......................... 202310084771.2

(51) Int. Cl.
*G02F 1/1335* (2006.01)
*G02F 1/1339* (2006.01)

(52) U.S. Cl.
CPC .... *G02F 1/133512* (2013.01); *G02F 1/13394* (2013.01)

(58) Field of Classification Search
None
See application file for complete search history.

(56) References Cited

U.S. PATENT DOCUMENTS

| | | | | |
|---|---|---|---|---|
| 2013/0342795 | A1* | 12/2013 | Park | G02F 1/133512 349/110 |
| 2015/0253608 | A1* | 9/2015 | Cho | G02F 1/13394 349/110 |
| 2015/0346533 | A1* | 12/2015 | Park | G02F 1/133512 349/42 |
| 2018/0231829 | A1* | 8/2018 | Itou | G02F 1/1343 |

FOREIGN PATENT DOCUMENTS

CN  203069938 U  *  7/2013

* cited by examiner

*Primary Examiner* — Shan Liu
(74) *Attorney, Agent, or Firm* — PV IP PC; Wei Te Chung

(57) ABSTRACT

A display panel is provided, wherein the display panel includes a first base, a second base, and an auxiliary portion. The first base includes a first substrate and a plurality of support posts, the second base includes a second substrate and a plurality of light-shielding portions. The plurality of support posts and the plurality of light-shielding portions are disposed between the first substrate and the second substrate. Each of the plurality of support posts corresponds to a corresponding one of the plurality of light-shielding portions. The auxiliary portion is disposed on a side of the light-shielding portion disposed with the support post.

8 Claims, 8 Drawing Sheets

D-D

DISPLAY PANEL

CROSS-REFERENCE TO RELATED APPLICATIONS

This application claims priority to Chinese Patent Application No. 202310084771.2, filed on Feb. 8, 2023, entitled "DISPLAY PANEL", which is incorporated herein by reference in its entirety.

TECHNICAL FIELD

The present application relates to the field of display technologies, and more particularly, to a display panel.

BACKGROUND

Liquid crystal display panel technology is highly mature and widely used in people's daily life, even in various extreme working environments. In order to better meet various application requirements of the consumer for the liquid crystal display panel, the product quality of the liquid crystal display panel needs to meet various requirements.

In the use of the liquid crystal display panel, the substrate is deformed due to external forces such as bending or collision, and the distance between the substrates is changed to squeeze the liquid crystal due to the deformation. The liquid crystal is unevenly distributed as being squeezed by the substrates. However, after the substrate is rebound with removal of the external forces, a gap is formed between the substrate and the liquid crystal, so that the display screen of the display panel is unevenly displayed with bubbles. One of the technical problems urgently needed to be solved by a person skilled in the art is to improve the liquid crystal display panel.

SUMMARY

The present application provides a display panel to solve a technical problem of display unevenness of a liquid crystal display panel in a knocking test with low temperature and reduced pressure.

To solve the above problem, the technical solution provided in the present application is as follows.

The present application provides a display panel comprising: a first base, wherein the first base comprises a first substrate and a plurality of support posts disposed on the first substrate; a second base, wherein the second base is disposed opposite to the first base, the second base comprises a second substrate and a plurality of light-shielding portions disposed on the second substrate, the plurality of support posts and the plurality of light-shielding portions are disposed between the first substrate and the second substrate, and each of the plurality of support posts corresponds to a corresponding one of the plurality of light-shielding portions; and an auxiliary portion, wherein the auxiliary portion is disposed on a side of the light-shielding portion disposed with the support post.

In some embodiments of the present disclosure, the auxiliary portion is connected to the light-shielding portion in a width direction of the light-shielding portion, a central plane of the support post parallel to the width direction of the light-shielding portion extends through the auxiliary portion; wherein from top view of the display panel, a distance between the support post and a first side wall of the light-shielding portion is less than a distance between the support post and a second side wall of the light-shielding portion, and the auxiliary portion is connected to the first side wall of the light-shielding portion.

In some embodiments of the present disclosure, the auxiliary portion is integrally provided with the light-shielding portion, and a thickness of the auxiliary portion is equal to a thickness of the light-shielding portion.

In some embodiments of the present disclosure, the auxiliary portion is integrally provided with the light-shielding portion, and a thickness of the auxiliary portion is greater than a thickness of the light-shielding portion.

In some embodiments of the present disclosure, from a top view of the display panel, the auxiliary portion is in a symmetrical shape, a symmetry axis of the auxiliary portion is parallel to the width direction of the light-shielding portion, and a center of the support post is close to the symmetry axis of the auxiliary portion.

In some embodiments of the present disclosure, a cross-section of the auxiliary portion from top view is triangular in shape, a bottom edge of the auxiliary portion is connected to the first side wall of the light-shielding portion.

In some embodiments of the present disclosure, the auxiliary portion is connected to an end of the support post close to the light-shielding portion; from top view of the display panel, an orthographic projection of the auxiliary portion on the first base is in an orthographic projection of the support post on the first base.

In some embodiments of the present disclosure, an end surface of the auxiliary portion is in contact with the light-shielding portion in a thickness direction of the light-shielding portion.

In some embodiments of the present disclosure, a thickness of the auxiliary portion is less than a thickness of the support post.

In some embodiments of the present disclosure, a distance between the support post and a first side wall of the light-shielding portion is less than a distance between the support post and a second side wall of the light-shielding portion, and the auxiliary portion is provided close to the first side wall.

In some embodiments of the present disclosure, a distance between the support post and a first side wall of the light-shielding portion is greater than a distance between the support post and a second side wall of the light-shielding portion, and the auxiliary portion is provided close to the second side wall.

In some embodiments of the present disclosure, a step structure is defined between an end surface of the auxiliary portion and an end surface of the support post, and the step structure is configured to be engaged with the light-shielding portion.

In some embodiments of the present disclosure, a contact hole is provided on a side of the first base toward the second base, from top view of the display panel, an orthographic projection of the contact hole on the first base is in an orthographic projection of the light-shielding portion on the first base.

In some embodiments of the present disclosure, the support post is provided on a different side from the contact hole relative to a center line of the light-shielding portion in the length direction.

In some embodiments of the present disclosure, the display panel further comprises a plurality of secondary support posts, each of the plurality of secondary support posts corresponds to a corresponding one of the plurality of light-shielding portions.

According to the embodiments of the present disclosure, in the case that the auxiliary portion and the light-shielding portion are connected, the support post is slid toward a side of the light-shielding portion by an external force, and the auxiliary portion can increase a sliding space for the support post, thereby preventing the support post from losing a supporting effect due to missing step. In the case that the auxiliary portion and the support post are connected, the support post provided with the auxiliary portion is compressed, and the contact force between the support post and the light-shielding portion is increased, thereby preventing the support post from sliding, reducing a distance variation between the first base and the second base and reducing an extent of squeezing on the liquid crystal.

BRIEF DESCRIPTION OF THE DRAWINGS

In order that the technical solution in the embodiments of the present disclosure may be explained more clearly, references will now be made briefly to the accompanying drawings required for the description of the embodiments. It will be apparent that the accompanying drawings in the following description are merely some of the embodiments of the present disclosure, and other drawings may be made to those skilled in the art without involving any inventive effort.

DETAILED DESCRIPTION OF THE EMBODIMENTS

Figure 1:
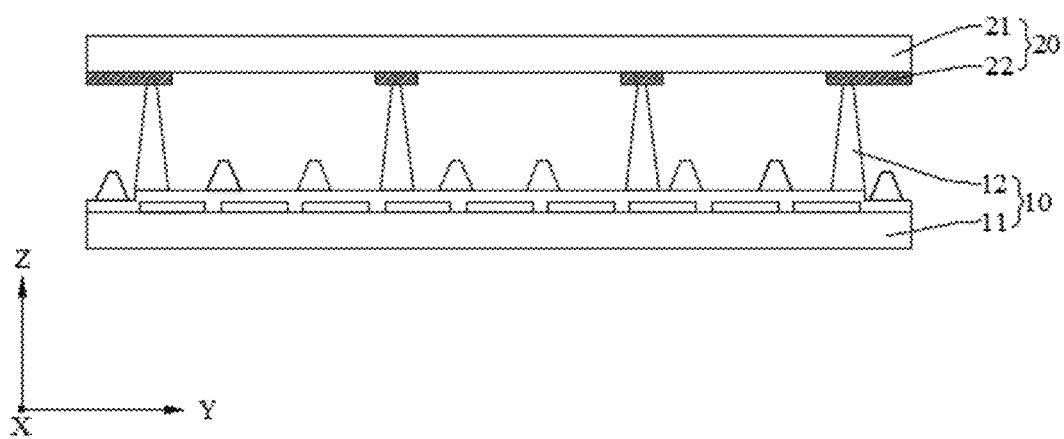
FIG. 1 is a schematic sectional diagram of a display panel according to the present application.

The technical solutions in the embodiments of the present disclosure will be clearly and completely described in connection with the accompanying drawings in the embodiments of the present disclosure. It will be apparent that the described embodiments are merely a part of the embodiments of the present disclosure, rather than all the embodiments. Based on the embodiments in the present disclosure, all other embodiments obtained by a person skilled in the art without any inventive effort are within the scope of the present disclosure.

In the description of this disclosure, it should be understood that the azimuth or positional relationship indicated by the terms "center", "length", "width", "up", "down", "front", "back", "left", "right", "inside", "outside", and the like, is based on the azimuth or positional relationship shown in the drawings, merely to facilitate and simplify the description of this disclosure, and not to indicate or imply that the indicated device or element must have a particular azimuth, be constructed and operated in a particular azimuth, and therefore is not to be construed as limiting the disclosure. Furthermore, the terms "first" and "second" are used for descriptive purposes only and are not to be construed as indicating or implying relative importance or implying the number of indicated technical features. Thus, features defined as "first", "second" may expressly or implicitly include one or more of said features. In the description of this application, "plurality" means two or more, unless otherwise expressly and specifically defined.

In the description of the present disclosure, unless expressly defined and defined otherwise, terms such as "connected with", "connected to", "mounted", "fixed" and the like are to be understood in a broad sense, for example, may be fixedly connected, detachably connected, or as a whole; may be mechanically connected or electrically connected; may be directly connected, indirectly connected through an intermediate medium, connected inside the two elements or interacted between the two elements. It will be appreciated by those of ordinary skill in the art that the foregoing may be understood as a specific meaning within the present invention, depending on the specific circumstances.

In the use of the liquid crystal display panel, the substrate is deformed due to external forces such as bending or collision, and the distance between the substrates is changed to squeeze the liquid crystal due to the deformation. The liquid crystal is unevenly distributed as being squeezed by the substrates. However, after the substrate is rebound with removal of the external forces, a gap is formed between the substrate and the liquid crystal, so that the display screen of the display panel is unevenly displayed with bubbles. One of the technical problems urgently needed to be solved by a person skilled in the art is to improve the liquid crystal display panel. The following solutions are provided based on the above-mentioned technical problem.

A display panel is provided, wherein the display panel includes a first base 10, and a second base 20 opposite to the first base 10. The first base 10 includes a first substrate 11 and a plurality of support posts 12 disposed on the first substrate 11. The second base 20 includes a second substrate 21 and a plurality of light-shielding portions 22 disposed on the second substrate 21. The plurality of support posts 12 and the plurality of light-shielding portions 22 are disposed between the first substrate 11 and the second substrate 21. Each of the plurality of support posts 12 is provided corresponding to a corresponding one of the plurality of light-shielding portions 22. The display panel further includes an auxiliary portion 30, wherein the auxiliary portion 30 is disposed on a side of at least one of the light-shielding portions 22 close to the corresponding support post 12 or disposed on an end of the support post 12 close to the light-shielding portion 22. The auxiliary portion 30 is connected to the light-shielding portion 22 or the support post 12 corresponding to the light-shielding portion 22.

In the case that the auxiliary portion 30 is connected to the light-shielding portion 22 along the width direction Y of the light-shielding portion 22 and the support post 12 is slid toward the side of the light-shielding portion 22 by an external force, the auxiliary portion 30 is capable of increasing the sliding space for the support post 12 to prevent the support post 12 from losing support due to sliding out of the light-shielding portion 22, i.e., "missing step". In the case that the auxiliary portion 30 is connected to an end of the support post 12 close to the light-shielding portion 22, the support post 12 provided with the auxiliary portion 30 is compressed due to an increasing contact force between the support post 12 and the light-shielding portion 22, so that the support post 12 is prevented from sliding, thereby reducing the distance variation between the first base 10 and the second base 20 and reducing the extent of squeezing on the liquid crystal.

Figure 2:
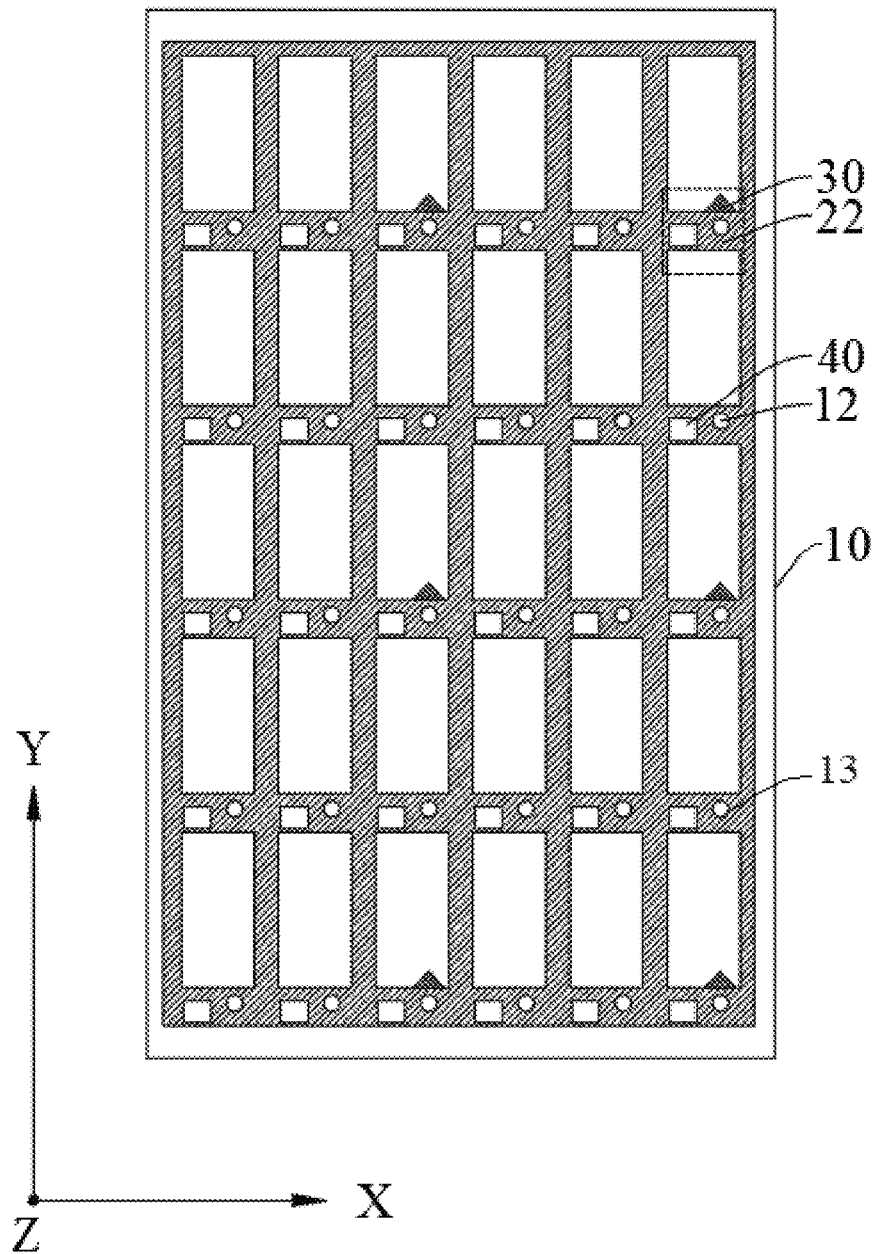
FIG. 2 is a schematic top diagram of a display panel according to the present application.

Referring to FIG. 1 to FIG. 2, FIG. 1 is a schematic sectional diagram of a display panel according to the present application, and FIG. 2 is a schematic top diagram of a display panel according to the present application. The display panel includes a first base 10, a second base 20 opposite to the first base 10, and a liquid crystal layer (not shown) is disposed between the first base 10 and the second base 20. A plurality of support posts 12 and a plurality of light-shielding portions 22 are provided between the first base 10 and the second base 20, and the plurality of light-shielding portions 22 is arranged in at least two directions of the display panel. For example, the plurality of light-shielding portions 22 may be arranged along the length direction X of the light-shielding portion 22 and the width direction Y of the light-shielding portion 22, wherein the length direction X of the light-shielding portion 22 is perpendicular to the width direction Y of the light-shielding portion 22. The plurality of light-shielding portions 22 are connected with each other and define pixel openings of the display panel. It should be noted that, in some embodiments, the length direction X and the width direction Y of the light-shielding portion 22 may be interchanged. The width direction Y of the light-shielding portion 22 may be the direction for the support post 12 to slide toward the pixel opening. The light-shielding section 22 can shield the metal wiring, the thin film transistor, and the like of the display panel, thereby preventing the light of the pixel from leaking. From top view of the display panel, the orthographic projection of the support post 12 on the first base 10 is in the orthographic projection of the light-shielding portion 22 on the first base 10.

The display panel further includes an array layer disposed on the first substrate 11, and the array layer includes a plurality of thin film transistors in array. The thin film transistor is configured to drive the liquid crystal in the display panel to deflect, so that the liquid crystal achieves different light transmittance and displays different brightness. The array layer includes a plurality of insulating layers on which a contact hole 40 is provided, and a pixel electrode of the display panel is connected to a source or drain of the thin film transistor through the contact hole 40 to provide a driving voltage for the liquid crystal. As shown in FIG. 2, from top view of the display panel, the orthographic projection of the contact hole 40 on the first base 10 is in the orthographic projection of the light-shielding portion 22 on the first base 10.

In some embodiments, as shown in FIG. 2, from top view of the display panel, the width of the light-shielding portion 22 between the two adjacent pixel openings in the column direction of the display panel is greater than the width of the light-shielding portion 22 between the two adjacent pixel openings in the row direction of the display panel. The support post 12 may be provided corresponding to the light-shielding portion 22 between the two adjacent pixel openings in the column direction of the display panel, and the orthographic projection of the support post 12 is in the orthographic projection of the light-shielding portion 22. The position of the support post 12 can be adjusted according to the shape and width of the light-shielding portion 22, which is not limited in the present application.

In the present embodiment, the display panel further includes an auxiliary portion 30 provided on a side of at least one of the light-shielding portions 22 close to the support post 12, that is, the auxiliary portion 30 may be provided on a side of the light-shielding portion 22 close to the support post 12 in the width direction Y of the light-shielding portion 22, or the auxiliary portion 30 may be provided on a side of the light-shielding portion 22 close to the support post 12 in the thickness direction Z of the light-shielding portion 22. The length direction X of the light-shielding section 22, the width direction Y of the light-shielding section 22, and the thickness direction Z of the light-shielding section 22 are perpendicular to each other.

Figure 3A:
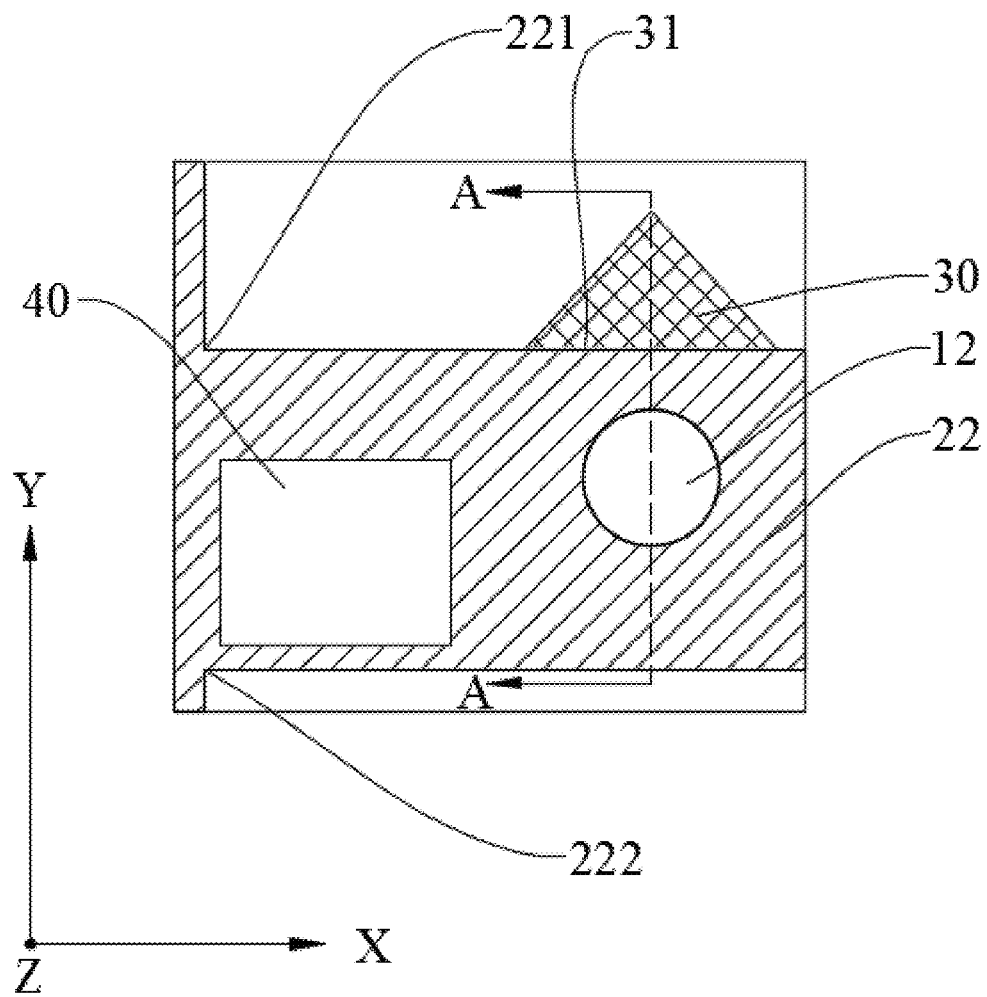
FIG. 3A is a first partial enlarged view of a top view of a display panel according to the present application.
Figure 3B:
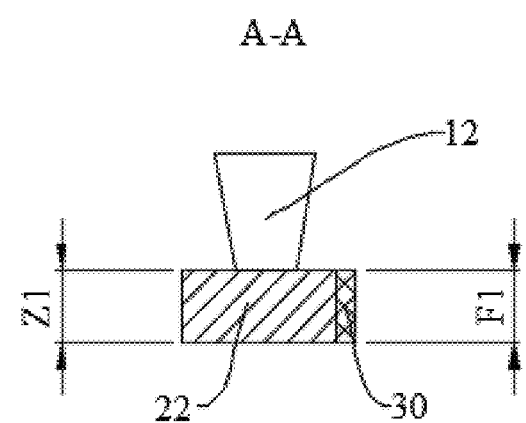
FIG. 3B is a schematic cross-sectional diagram of A-A section in FIG. 3A.
Figure 4A:
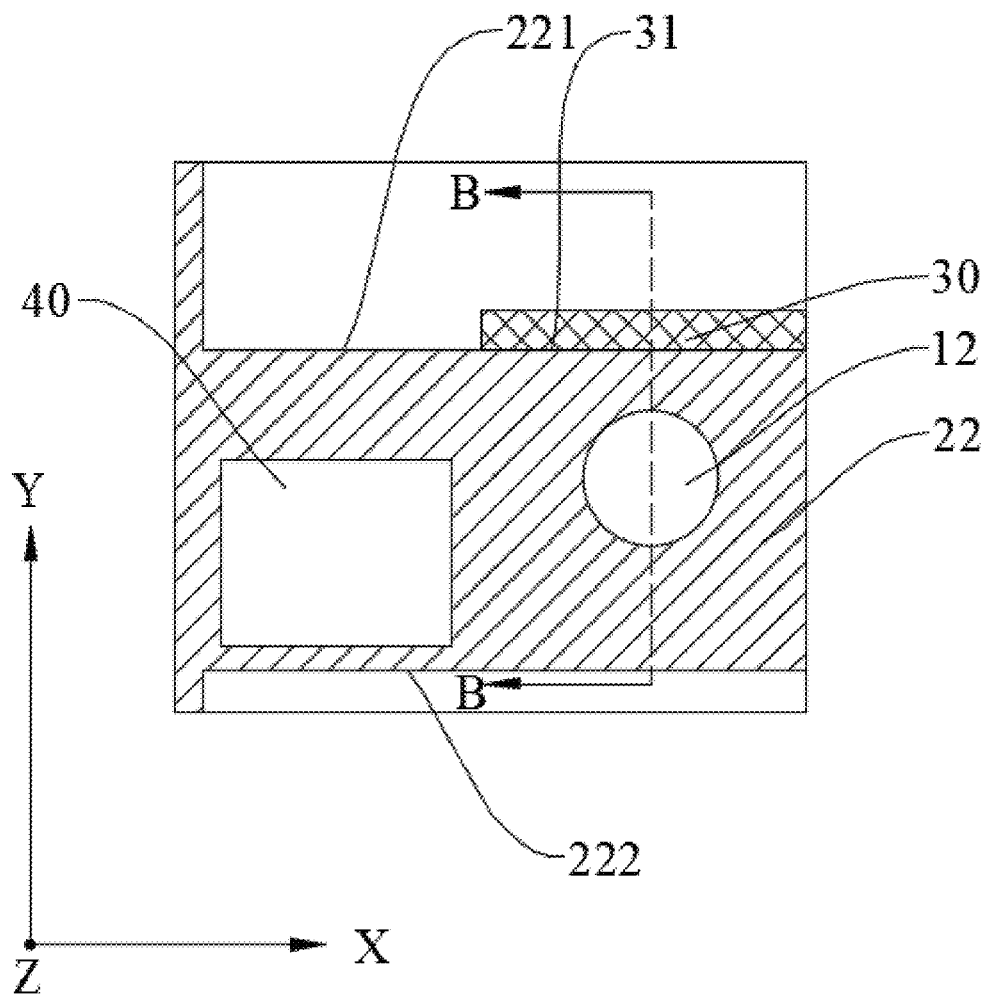
FIG. 4A is a second partial enlarged view of a top view of the display panel according to the present application.
Figure 4B:
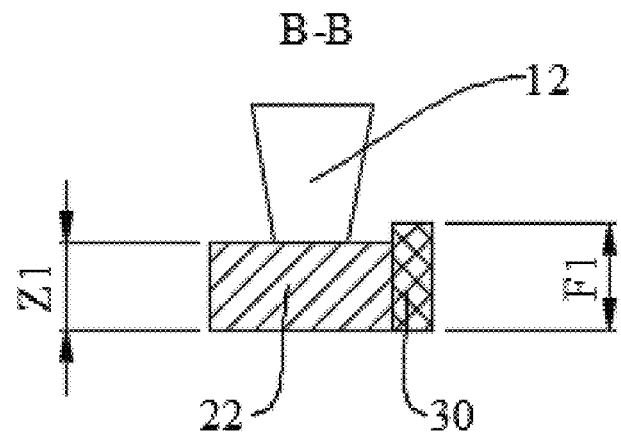
FIG. 4B is a schematic cross-sectional diagram of B-B section in FIG. 4A.
Figure 5A:
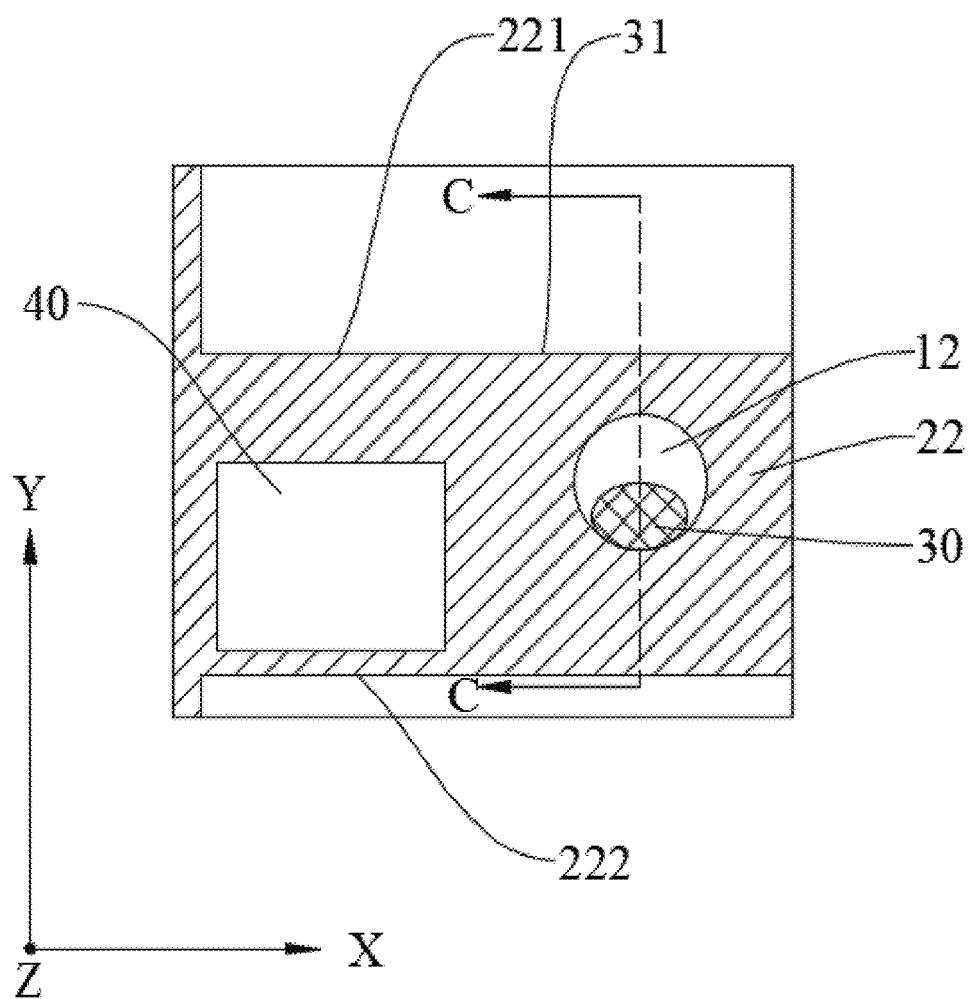
FIG. 5A is a third partial enlarged view of a top view of the display panel according to the present application.
Figure 5B:
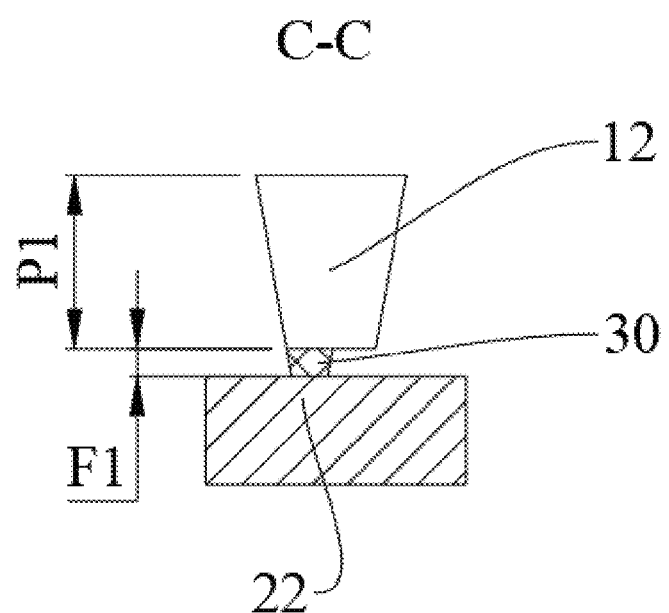
FIG. 5B is a schematic cross-sectional diagram of C-C section in FIG. 5A.
Figure 6A:
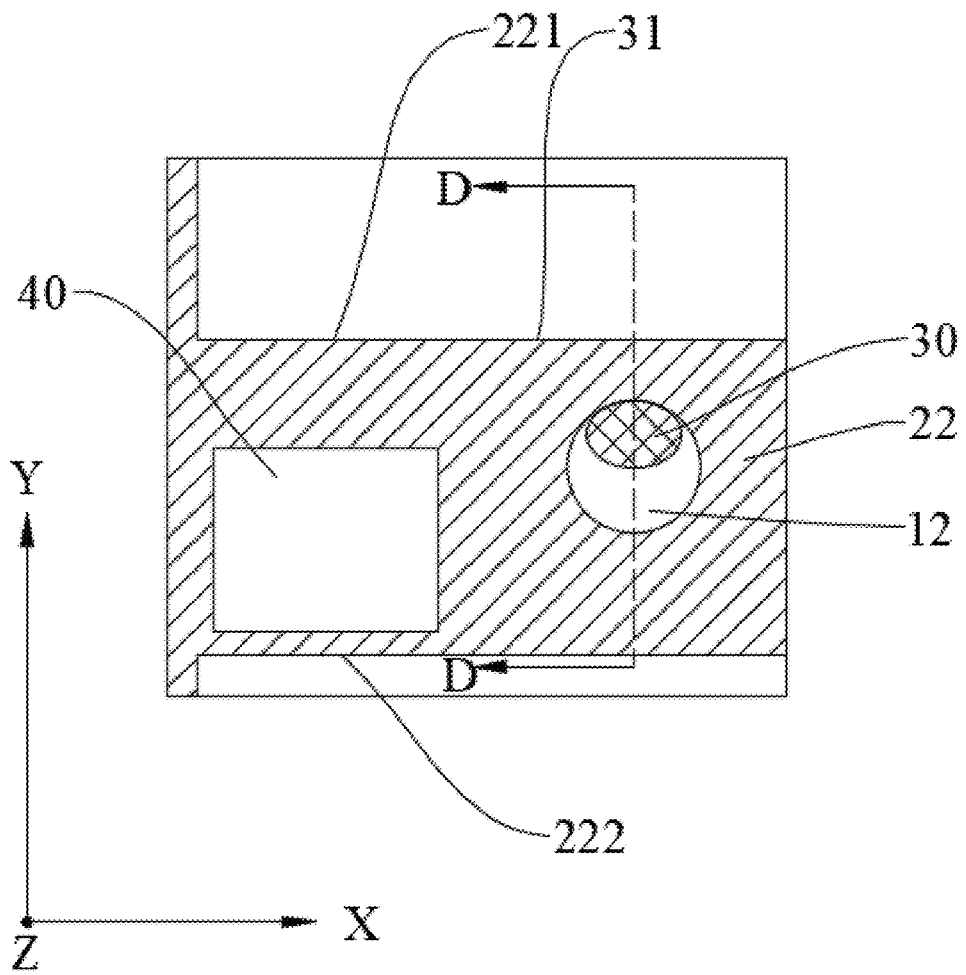
FIG. 6A is a fourth partial enlarged view of a top view of the display panel according to the present application.
Figure 6B:
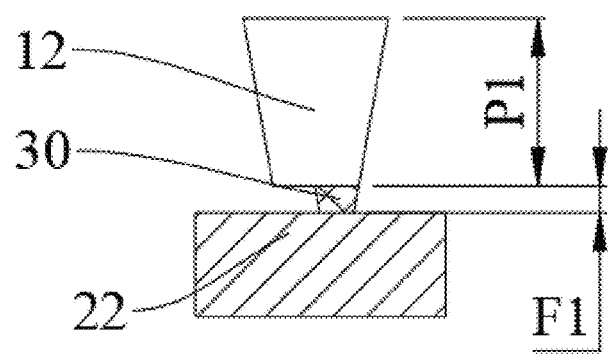
FIG. 6B is a schematic cross-sectional diagram of D-D section in FIG. 6A.
Figure 7:
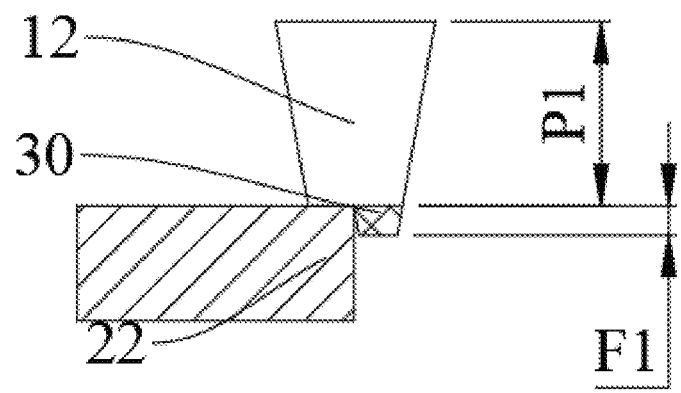
FIG. 7 is a transition state of a schematic cross-sectional diagram of D-D section in FIG. 6A.

Referring to FIG. 3A to FIG. 7, FIG. 3A is a first partial enlarged view of a top view of a display panel according to the present application, FIG. 3B is a schematic cross-sectional diagram of A-A section in FIG. 3A, FIG. 4A is a second partial enlarged view of a top view of the display panel according to the present application, FIG. 4B is a schematic cross-sectional diagram of B-B section in FIG. 4A, FIG. 5A is a third partial enlarged view of a top view of the display panel according to the present application, FIG. 5B is a schematic cross-sectional diagram of C-C section in FIG. 5A, FIG. 6A is a fourth partial enlarged view of a top view of the display panel according to the present application, FIG. 6B is a schematic cross-sectional diagram of D-D section in FIG. 6A, and FIG. 7 is a transition state of a schematic cross-sectional diagram of D-D section in FIG. 6A.

In FIG. 3A to FIG. 4B, the auxiliary portion 30 is provided on a side of the light-shielding portion 22 close to the support post 12 in the width direction Y of the light-shielding portion 22; and in FIG. 4A to FIG. 6B, the auxiliary portion 30 is provided on a side close to the support post 12 in the thickness direction Z of the light-shielding portion 22. In the case that the auxiliary portion 30 is provided on the side of the light-shielding portion 22 close to the support post 12 in the width direction Y of the light-shielding portion 22, the auxiliary portion 30 is connected to the light-shielding portion 22 in the width direction Y of the light-shielding portion 22. In the case that the auxiliary portion 30 is provided on the side close to the support post 12 in the thickness direction Z of the light-shielding portion 22, the auxiliary portion 30 is connected to the end of the support post 12 close to the light-shielding portion 22.

In the present embodiment, the display panel may be a color filter on array (COA) display panel. The display panel may further include a color filter layer disposed on the first base 10. The color filter layer includes a red filter layer, a green filter layer, and a blue filter layer, thereby realizing color display.

In the present embodiment, the display panel may further include a secondary support post 13, the size of the secondary support post 13 in the thickness direction Z is less than the size of the support post 12 in the thickness direction Z. In the case that the first base 10 and the second base 20 of the display panel are pressed close to each other by an external force, the secondary support post 13 may serve as an auxiliary support to enhance the impact resistance of the display panel.

In the present embodiment, referring to FIG. 2, from top view of the display panel, the support post 12 may have a same area of the cross-section as the secondary support post 13. The support post 12 is provided corresponding to the auxiliary portion 30, and the secondary support post 13 is not provided correspond to the auxiliary portion 30. That is, for one pixel opening of the display panel, either the support post 12 or the secondary support post 13 may be provided.

The number and distribution density of the support posts 12 may be adjusted according to actual requirements. For example, in some embodiments, to provide a better support at the middle region of the display panel, the support posts 12 at the middle region of the display panel may be denser than the support posts 12 at the edge region of the display panel, thereby increasing the support at the middle region of the display panel. The material of the support post 12 may be the conventional material such as resin, which is not limited in the present application.

The technical solution of the present application is described in connection with the following specific embodiments and examples.

Referring to FIG. 3A to FIG. 4B, in the display panel of the present application, the auxiliary portion 30 is connected to the corresponding light-shielding portion 22 in the width direction Y of the light-shielding portion 22. From top view of the display panel shown in FIG. 3A, the light-shielding portion 22 includes the first side wall 221 and the second side wall 222. The distance between the support post 12 and the first side wall 221 of the light-shielding portion 22 is less than the distance between the support post 12 and the second side wall 222 of the light-shielding portion 22, and the auxiliary portion 30 is connected to the first side wall 221 of the light-shielding portion 22. As such, in the case that the support post 12 is slid toward the first side wall 221 by an external force, the auxiliary portion 30 is provided to increase the sliding space for the support post 12 and to prevent the support post 12 from losing support due to sliding out of the light-shielding portion 22, i.e., "missing step".

Referring to FIG. 3A to FIG. 4B, from top view of the display panel shown in FIG. 3A, since the distance between the support post 12 and the second side wall 222 is greater than the distance between the support post 12 and the first side wall 221. In the case that the support post 12 is slid toward the second side wall 222 by an external force, there is still sufficient sliding space to ensure that the support post 12 does not loss support by missing step. Therefore, the auxiliary portion 30 may be merely need to be provided with the first side wall 221 of the light-shielding portion 22.

Further, a central plane of the support post 12 parallel to the width direction Y of the light-shielding portion 22 extends through the auxiliary portion 30. The center plane of the support post 12 refers to a plane passing through the center line of the support post 12 along the thickness direction Z of the light-shielding portion 22 and parallel to the width direction Y of the light-shielding portion 22. Therefore, when the support post 12 is slid toward the first side wall 221, the orthographic projection of the support post 12 on the first base 10 is in the orthographic projection of the light-shielding portion 22 on the first base 10 or the orthographic projection of the auxiliary portion 30 on the first base 10, so as to prevent the support post 12 from missing step during sliding and losing support.

Further, from top view as shown in FIG. 3A, the distance from the center of the support post 12 to the second side wall 222 may be close to the distance from the center of the support post 12 to the most distal end (relative to the support post 12) of the auxiliary portion 30. The support is ensured while the area of the cross-section of the auxiliary portion 30 from top view is not large, and thus, the influence on the opening rate of the display panel is reduced.

Referring to FIG. 3A and FIG. 4A, the cross-section of the auxiliary portion 30 from top view may be triangular in shape. Specifically, the bottom edge 31 of the auxiliary portion 30 is connected with the first side wall 221 of the light-shielding portion 22, so that the auxiliary portion 30 is continuously provided with the light-shielding portion 22. In the case that the support post 12 slides toward the auxiliary portion 30, the auxiliary portion 30 can increase the sliding space for the support post 12, thereby preventing the support post 12 from missing step and losing support during sliding. The auxiliary portion 30 may be provided with another shape, the arrangement of which is similar to the arrangement of the auxiliary portion 30 with triangular in shape.

Referring to FIG. 3A and FIG. 3B, in the display panel of the present application, the auxiliary portion 30 is integrally provided with the light-shielding portion 22, and the thickness F1 of the auxiliary portion 30 is equal to the thickness Z1 of the light-shielding portion 22 in the thickness direction Z of the light-shielding portion 22.

Referring to FIG. 3A and FIG. 3B, the auxiliary portion 30 is integrally provided with the light-shielding portion 22, that is, the auxiliary portion 30 is connected to the light-shielding portion 22. Specifically, in the case that the auxiliary portion 30 is triangular in shape, the bottom edge of the auxiliary portion 30 is connected with the first side wall 221 of the light-shielding portion 22. The auxiliary portion 30 and the light-shielding portion 22 may be formed by using the same photomask, thereby saving the number of photomasks and not increasing the manufacturing cost of the display panel.

In the present embodiment, the thickness F1 of the auxiliary portion 30 is equal to the thickness Z1 of the light-shielding portion 22, so that the support post 12 can slide smoothly to the auxiliary portion 30 when subjected to an external force, thereby reducing the risk of breaking the support post 12. At the same time, by increasing the sliding space for the support post 12, the support post 12 is prevented from being missing step and losing support during sliding.

Referring to FIG. 4A and FIG. 4B, in the display panel of the present application, the auxiliary portion 30 is integrally provided with the light-shielding portion 22, and the thickness F1 of the auxiliary portion 30 is greater than the thickness Z1 of the light-shielding portion 22 in the thickness direction Z of the light-shielding portion 22.

In the present embodiment, referring to FIG. 4A and FIG. 4B, the auxiliary portion 30 may be rectangular in shape, and the long side of the auxiliary portion 30 is connected with the first side wall 221 of the light-shielding portion 22. The shape of the auxiliary portion 30 may be provided as required, which is not limited in the present application. The thickness F1 of the auxiliary portion 30 is greater than the thickness Z1 of the light-shielding portion 22, so that the auxiliary portion 30 can block the sliding of the support post 12, thereby reducing the distance variation between the first base 10 and the second base 20 and reducing the extent of squeezing on the liquid crystal.

Referring to FIG. 3A to FIG. 4B, in the display panel of the present application, the auxiliary portion 30 is symmetrical in shape, and the symmetry axis of the auxiliary portion 30 parallel to the width direction Y of the light-shielding portion 22 from top view of the display panel, and the center of the support post 12 is close to the symmetry axis of the auxiliary portion 30.

In the present embodiment, referring to FIG. 3A to FIG. 4B, the auxiliary portion 30 is integrally provided with the light-shielding portion 22. From top view of the display panel, the auxiliary portion 30 is symmetrized relative to the symmetry axis of the auxiliary portion 30 parallel to the width direction Y of the light-shielding portion 22, and the center of the support post 12 is close to the symmetry axis of the auxiliary portion 30. As such, the orthographic projection of the support post 12 on the first base 10 is in the orthographic projection of the auxiliary portion 30 on the first base 10 when sliding toward the first side wall 221 of the light-shielding portion 22. The shape of the auxiliary portion 30 may be an ellipse, a semicircle, a polygon, or the like, which is not limited in the present application.

In some embodiments, the auxiliary portion 30 is symmetrical about the central plane of the support post 12, so that the portion of the auxiliary portion 30 extended into the area of the pixel is reduced, and the influence on the opening rate of the display panel is further reduced. At the same time, the sliding space for the support post 12 subjected to an external force is increased to prevent failure of the support.

In the present embodiment, the size of the auxiliary portion 30 in the width direction Y of the light-shielding portion 22 can be set as required as long as the support post 12 can be contacted with the auxiliary portion 30 as sliding beyond the light-shielding portion 22. For example, in the case that the sliding distance of the support post 12 subjected to an external force does not exceed 10 um, the size of the auxiliary portion 30 in the width direction may be set to 10 um, but is not limited thereto.

Referring to FIG. 5A to FIG. 6B, in the display panel of the present application, the auxiliary portion 30 is connected to an end of the support post 12 close to the light-shielding portion 22, and the auxiliary portion 30 is integrally provided with the support post 12. From top view of the display panel, the orthographic projection of the auxiliary portion 30 on the first base 10 is in the orthographic projection of the support post 12 on the first base 10.

Referring to FIG. 5A to FIG. 6B, the auxiliary portion 30 is connected to the end of the support post 12 close to the light-shielding portion 22, and the auxiliary portion 30 is integrally provided with the support post 12. That is, the auxiliary portion 30 and the support post 12 may be made by the same material and by using the same photomask. For example, the auxiliary portion 30 and the support post 12 may be made of a halftone photomask to form different heights, so that the manufacturing process of the auxiliary portion 30 is simplified, and the manufacturing cost is not increased.

Further, from top view of the display panel, the orthographic projection of the auxiliary portion 30 on the first base 10 is in the orthographic projection of the support post 12 on the first base 10, and the distance between the support post 12 and the first side wall 221 of the light-shielding portion 22 is greater than the distance between the support post 12 and the second side wall 222 of the light-shielding portion 22.

Alternatively, the auxiliary portion 30 is provided close to the first side wall 221 or the auxiliary portion 30 is provided away from the first side wall 221.

Further, the auxiliary portion 30 is symmetrical about the central plane of the support post 12. The center plane of the support post 12 refers to a plane passing through the center line of the support post 12 along the thickness direction Z of the light-shielding portion 22 and parallel to the width direction Y of the light-shielding portion 22. As such, the support post 12 is slid stably when the auxiliary portion 30 is compressed between the support post 12 and the light-shielding portion 22.

Alternatively, the auxiliary portion 30 is provided at any position at the end of the support post 12 close to the light-shielding portion 22.

According to the present embodiment, the auxiliary portion 30 is provided at the end of the support post 12 close to the light-shielding portion 22, so that the auxiliary portion 30 is compressed by the support post 12, the contact force between the support post 12 and the light-shielding portion 22 is increased, and the support post 12 is prevented from sliding, thereby reducing the distance variation between the first base 10 and the second base 20, and reducing the extent of squeezing on the liquid crystal.

In the present embodiment, referring to FIG. 5A and FIG. 5B, the distance between the support post 12 and the first side wall 221 of the light-shielding portion 22 is greater than the distance between the support post 12 and the second side wall 222 of the light-shielding portion 22, the auxiliary portion 30 is provided away from the first side wall 221, and the auxiliary portion 30 is in contact with the light-shielding portion 22 in the thickness direction Z of the light-shielding portion 22. Therefore, the distance between the auxiliary portion 30 and the first side wall 221 is increased, and the risk of the auxiliary portion 30 slipping out of the light-shielding portion 22 is reduced.

Alternatively, referring to FIG. 6A to FIG. 6B, the distance between the support post 12 and the first side wall 221 of the light-shielding portion 22 is less than the distance between the support post 12 and the second side wall 222 of the light-shielding portion 22, and the auxiliary portion 30 is provided close to the first side wall 221.

As shown in FIG. 6A and FIG. 6B, the distance between the support post 12 and the first side wall 221 of the light-shielding portion 22 is less than the distance between the support post 12 and the second side wall 222 of the light-shielding portion 22, and the auxiliary portion 30 is provided close to the first side wall 221. As such, the auxiliary portion 30 is slid toward the first side wall 221 of the light-shielding portion 22 as the support post 12 is pressed by an external force and slid, the auxiliary portion 30 is in contact with the light-shielding portion 22 in the width direction Y of the light-shielding portion 22. A step structure is defined between the end surface of the auxiliary portion 30 and the end surface of the support post 12, and the step structure is engaged with the light-shielding portion 22 (as shown in FIG. 7) as the external force is removed. Therefore, the support post 12 cannot be quickly returned to the original position, thereby slowing the first base 10 and the second base 20 to return to the original position, preventing a gap from being formed between the liquid crystal layer and the second base 20, and preventing display unevenness caused by the gap. It should be noted that FIG. 7 is a transition state in which the auxiliary portion 30 is engaged with the light-shielding portion 22 after pressing the display panel. The auxiliary portion 30 of the display panel can finally contact with the light-shielding portion 22 in the thickness direction Z of the light-shielding portion 22 (similar to the state in FIG. 6B).

Further, the auxiliary portion 30 is symmetrical about the central plane of the support post 12. The center plane of the support post 12 refers to a plane passing through the center line of the support post 12 along the thickness direction Z of the light-shielding portion 22 and parallel to the width direction Y of the light-shielding portion 22. The step structure defined between the auxiliary portion 30 and the light-shielding portion 22 is subjected with a more uniform external force.

Referring to FIG. 5A to FIG. 6B, in the display panel of the present application, the thickness F1 of the auxiliary portion 30 is less than the thickness P1 of the support post 12 in the thickness direction Z of the light-shielding portion 22.

In the present embodiment, referring to FIG. 5A to FIG. 6B, the thickness F1 of the auxiliary portion 30 is less than the thickness P1 of the support post 12, so that the height of the support post 12 with the auxiliary portion 30 is slightly greater than the height of the support post 12 without the auxiliary portion 30. The support post 12 provided with the auxiliary portion 30 is compressed, and the contact force between the support post 12 and the light-shielding portion 22 is increased to prevent the support post 12 from sliding, thereby reducing the distance variation between the first base 10 and the second base 20, and reducing the extent of squeezing on the liquid crystal.

Alternatively, the thickness F1 of the auxiliary portion 30 is less than the thickness Z1 of the light-shielding portion 22. Since the side wall of the auxiliary portion 30 is tapered, when the thickness F1 of the auxiliary portion 30 decreases, the area of the auxiliary portion 30 contacted with the light-shielding portion 22 increases, thereby increasing the strength of the auxiliary portion 30 and preventing the auxiliary portion 30 from breaking.

Referring to FIG. 2 to FIG. 6B, in the display panel of the present application, the contact hole 40 is provided on the side of the first base 10 toward the second base 20, and from top view of the display panel, the orthographic projection of the contact hole 40 on the first base 10 is in the orthographic projection of the light-shielding portion 22 on the first base 1. The support post 12 is provided on the different side from the contact hole 40 relative to the center line of the light-shielding portion 22 in the length direction X.

In the present embodiment, referring to FIG. 2 to FIG. 6B, from top view of the display panel, the orthographic projection of the contact hole 40 on the first base 10 is in the orthographic projection of the light-shielding portion 22 on the first base 10. The contact hole 40 is provided close to the second side wall 222 of the light-shielding portion 22, and the support post 12 is provided close to the first side wall 221 of the light-shielding portion 22. That is, the distance between the contact hole 40 and the first side wall 221 is greater than the distance between the contact hole 40 and the second side wall 222, and the distance between the support post 12 and the first side wall 221 is less than the distance between the support post 12 and the second side wall 222. As such, the distance between the support post 12 and the contact hole 40 is increased without increasing the width of the light-shielding portion 22 of the display panel, thereby ensuring that the process of the support post 12 is not affected by the contact hole 40.

In some embodiments, the contact hole 40 may be provided at an intermediate position of the light-shielding portion 22 in the width direction Y. Correspondingly, the support post 12 may be provided at an intermediate position of the light-shielding portion 22 in the width direction Y, and the auxiliary portion 30 may be disposed on two sides of the light-shielding portion 22 and symmetrical about the central plane in the length direction X, so as to ensure that the support post 12 can be supported by the auxiliary portion 30 when sliding in the width direction Y of the light-shielding portion 22, thereby preventing the support post 12 from missing step and losing support.

In the above-mentioned embodiments, the description of each embodiment has its own emphasis, and parts not described in detail in a certain embodiment may be referred to the related description of other embodiments.

The present invention has been described in detail with reference to a display panel according to an embodiment of the present application. The specific embodiments are used to illustrate the principles and embodiments of the present application. The description of the above embodiment is merely intended to help understand the technical solution and the core idea of the present application. It will be appreciated by those of ordinary skill in the art that modifications or equivalents may be made to the embodiments. These modifications or equivalents do not depart s from the scope of the embodiments of the present application.

What is claimed is:

1. A display panel, comprising:
a first base, wherein the first base comprises a first substrate and a plurality of support posts disposed on the first substrate;
a second base, wherein the second base is disposed opposite to the first base, the second base comprises a second substrate and a plurality of light-shielding portions disposed on the second substrate, the plurality of support posts and the plurality of light-shielding portions are disposed between the first substrate and the second substrate, and each of the plurality of support posts corresponds to a corresponding one of the plurality of light-shielding portions; and
an auxiliary portion, wherein the auxiliary portion is disposed on a side of the light-shielding portion disposed with the support post and is connected to a first side wall of the light-shielding portion,
wherein from a top view of the display panel, a distance between the support post and the first side wall of the light-shielding portion is less than a distance between the support post and a second side wall of the light-shielding portion;
wherein the auxiliary portion is arranged to prevent the support post from losing support in case the support post slides along the light-shielding portion due to an external force; and
wherein a thickness of the auxiliary portion is greater than a thickness of the light-shielding portion, and the auxiliary portion is configured to block the support post from sliding past the first side wall of the light-shielding portion.

2. The display panel of claim 1, wherein the auxiliary portion is connected to the light-shielding portion in a width direction of the light-shielding portion, and a central plane of the support post parallel to the width direction of the light-shielding portion extends through the auxiliary portion.

3. The display panel of claim 2, wherein the auxiliary portion is integrally provided with the light-shielding portion.

4. The display panel of claim 2, wherein from a top view of the display panel, the auxiliary portion is in a symmetrical shape, a symmetry axis of the auxiliary portion is parallel to the width direction of the light-shielding portion, and a center of the support post is close to the symmetry axis of the auxiliary portion.

5. The display panel of claim 4, wherein a cross-section of the auxiliary portion from top view is rectangular in shape, a long edge of the auxiliary portion is connected to the first side wall of the light-shielding portion.

6. The display panel of claim 1, wherein a contact hole is provided on a side of the first base toward the second base, from top view of the display panel, an orthographic projection of the contact hole on the first base is in an orthographic projection of the light-shielding portion on the first base.

7. The display panel of claim 6, wherein the support post is provided on a different side from the contact hole relative to a center line of the light-shielding portion in the length direction.

8. The display panel of claim 1, wherein the display panel further comprises a plurality of secondary support posts, each of the plurality of secondary support posts corresponds to a corresponding one of the plurality of light-shielding portions.

* * * * *